(12) United States Patent
Rossi et al.

(10) Patent No.: US 6,418,958 B1
(45) Date of Patent: Jul. 16, 2002

(54) DUAL SOLID CHEMICAL FEED SYSTEM

(75) Inventors: Anthony M. Rossi, Tabernacle, NJ (US); Kenneth C. Barrett, Bensalem, PA (US)

(73) Assignee: BetzDearborn, Inc., Trevose, PA (US)

( * ) Notice: Subject to any disclaimer, the term of this patent is extended or adjusted under 35 U.S.C. 154(b) by 0 days.

(21) Appl. No.: 09/824,070

(22) Filed: Apr. 2, 2001

(51) Int. Cl.[7] .............................................. G05D 11/13
(52) U.S. Cl. .............................. 137/93; 137/5; 137/89; 137/101.11; 137/268; 134/93; 134/95.1
(58) Field of Search .............................. 137/101.11, 93, 137/268, 113, 89, 5; 134/93, 95.1

(56) References Cited

U.S. PATENT DOCUMENTS

| | | |
|---|---|---|
| 2,371,720 A | 3/1945 | Stine |
| 2,820,701 A | 1/1958 | Leslie |
| 3,383,178 A | 5/1968 | Dietz |
| 3,481,355 A * | 12/1969 | Watson et al. ............. 134/57 R |
| 3,595,438 A | 7/1971 | Daley et al. |
| 4,597,406 A * | 7/1986 | Loiseau et al. ............. 137/113 |
| 4,858,449 A | 8/1989 | Lehn |
| 4,964,185 A | 10/1990 | Lehn |
| 5,137,694 A * | 8/1992 | Copeland et al. ......... 134/56 D |

* cited by examiner

Primary Examiner—Stephen M. Hepperle
(74) Attorney, Agent, or Firm—Hoffman & Baron, LLP

(57) ABSTRACT

A solid chemical feed system, preferably including two feed bowls, comprises a quantity of solid chemicals that dissolve upon immersion in water to form a liquid solution. A sump is provided to receive liquid solution from the feed bowls, the liquid solution with additive chemicals being used as a treatment for cooling towers, boilers, or other industrial processes to inhibit corrosion and rust. The feed system comprises a valve system that is controlled by a sensor that detects the conductivity of the liquid solution to alternatingly switch the introduction of liquid solution from one feed bowl to the other feed bowl. As such, upon depletion of chemical feed in one bowl, desired treatment will continue and the empty bowl may be replaced without disruption of liquid solution supply.

24 Claims, 1 Drawing Sheet

DUAL SOLID CHEMICAL FEED SYSTEM

FIELD OF THE INVENTION

This invention relates generally to solid chemical feed systems and, more particularly, to a dual solid chemical feed system which incorporates an automated capability for switching liquid solution containing dissolved solid chemicals from one feed bowl to another when one of the bowls is empty.

BACKGROUND OF THE RELATED TECHNOLOGY

The utilization of automatic, solid chemical feed dispensers to dispense chemicals used in industrial and cleaning processes is well known in the art. For industrial applications, such dispenser mechanisms are commonly used to add chemicals to boiler systems or to cooling towers to minimize and/or inhibit corrosion. Automatic dispensers were developed to minimize or eliminate the manual care and attention required to periodically add chemicals to a tank containing the liquid solution. Automatic dispensers are generally placed into two broad categories depending upon the method of controlling the amount of chemicals to be dispensed: (1) time-controlled dispensers; (2) conductivity measurement dispensers.

One example of a method of dispensing a solution that is controlled by conductivity measurements is described in U.S. Pat. No. 4,858,449 issued to Lehn. Lehn discloses an automatic dispenser for dispensing solid chemicals used preferably in cleaning processes. Lehn discloses a dispenser wherein a container holds a quantity of dissolvable solid chemicals which is sprayed with water under pressure to dissolve the chemicals which are ultimately dispensed. The quantity of chemicals dispensed is controlled by measuring the conductivity of the chemical solution.

While automated dispensers have been effective in reducing the amount of manual attention required in maintaining such systems, problems may occur when the chemical in the dispenser container is exhausted. When the solid chemical in the feed container is completely dissolved, the empty container must be manually replaced by a new container filled with a new supply of solid chemicals. If the product is exhausted while the system is unattended, there is potential for the interruption in the chemical treatment of the system. This could occur over a period of hours, or potentially several days, for example, during weekends during which treatment chemicals would not be added to the system. The feed solution created by the dissolution of the solid chemical would not be replenished and would be quickly diluted by the addition of water which is used to maintain a constant level in the dissolution chamber of automatic dispensers. The loss of treatment could result in corrosion and/or deposition of contaminants in a cooling or boiler system, or serious deterioration in the treatment program performance in any system using the automatic solid feed dispenser.

Accordingly, improvements in automatic solid chemical feed or dispenser system is desirable to prevent the loss of chemical treatments which may result in serious damage in industrial systems or the like requiring continuous chemical treatment.

SUMMARY OF THE INVENTION

In accordance with a preferred arrangement of the invention, a solid chemical feed system comprises at least two feed bowls, each containing a quantity of solid chemicals that dissolve upon immersion in liquid to form a liquid solution. A sump is provided for receiving liquid solution from each feed bowl, and for containing such liquid solution at a predetermined level. A valve system is coupled to the feed bowls for separately controlling the introduction of liquid to the solid chemicals in each feed bowl. A sensor is supported by the sump in communication with the contained liquid solution for sensing a given, preselected property of the liquid solution, and for generating a signal in response to the detection of such property. A control unit is responsive to such signal for controlling the valve system to alternatingly switch the introduction of liquid from one feed bowl to the other.

In a particular aspect of the invention, there is provided a dual solid chemical feed system comprising two feed bowls, each of which contains a quantity of solid chemicals that dissolve upon immersion in water to form a liquid solution. A source for supplying water to each bowl is provided. A first valve is coupled to the water source for controlling the supply of water to one of said bowls. The first valve is normally maintained in an open position to allow flow of water to one of the bowls. A second valve is coupled to the water source for controlling a supply of water to the other of the bowls. The second valve is maintained in a normally closed position to prevent flow of water to the other bowl. A sump for receiving liquid solution from each of the bowls and for containing liquid solution therein at a predetermined level is provided. A sensor is supported by the sump in communication with liquid solution for sensing the conductivity of the liquid solution and for generating a signal at a predetermined conductivity of the liquid solution. A control unit is responsive to the signal for closing the first valve, thereby preventing flow of water to one of the bowls and for opening the second valve, thereby allowing flow of water to the other of the bowls.

In a further particular aspect of the invention, the feed system includes a third valve coupled to the water source for controlling the introduction of water into the sump. In yet another aspect of the invention, the control unit comprises a time controller for delaying the activation of the first valve and the second valve for a certain period of time after the sensor senses the predetermined conductivity of a liquid solution.

In yet a further particular aspect of the invention, an apparatus is provided for controlling the conductivity of liquid solution in a solid chemical feed system that supplies liquid solution containing dissolved chemicals. The apparatus includes at least one feed bowl containing a quantity of solid chemicals that dissolve upon immersion in water to form a liquid solution. A sump is included for receiving the liquid solution from such at least one bowl and for containing the liquid solution therein at a predetermined level. A water source is provided and a first valve is coupled to the water source for controlling the supply of water to such at least one bowl. A second valve is coupled to the water source for controlling the supply of water to the sump. A sensor is provided in the sump in communication with the liquid solution for sensing the conductivity of the liquid solution, and for generating a signal at a predetermined conductivity of the liquid solution. A control unit is included which is responsive to the sensor signal for opening the first valve and closing the second valve to thereby supply water to the feed bowl when the conductivity is below the predetermined conductivity, and for closing the first valve and opening the second valve to thereby supply water to the sump when the conductivity is above the predetermined conductivity. The apparatus for controlling the conductivity of the liquid solution is also used in a solid chemical feed system comprising two or more feed bowls. When the chemicals in one of the feed bowls is depleted, the control unit may alternatively switch between supplying fresh water directly from the water source to the sump or through the one bowl wherein the chemicals are depleted to lower the conductivity of the liquid solution in the sump.

BRIEF DESCRIPTION OF THE DRAWING

The sole drawing FIGURE is a schematic representation of the dual solid chemical feed system of the present invention.

DETAILED DESCRIPTION OF THE PREFERRED EMBODIMENTS

Figure 1:
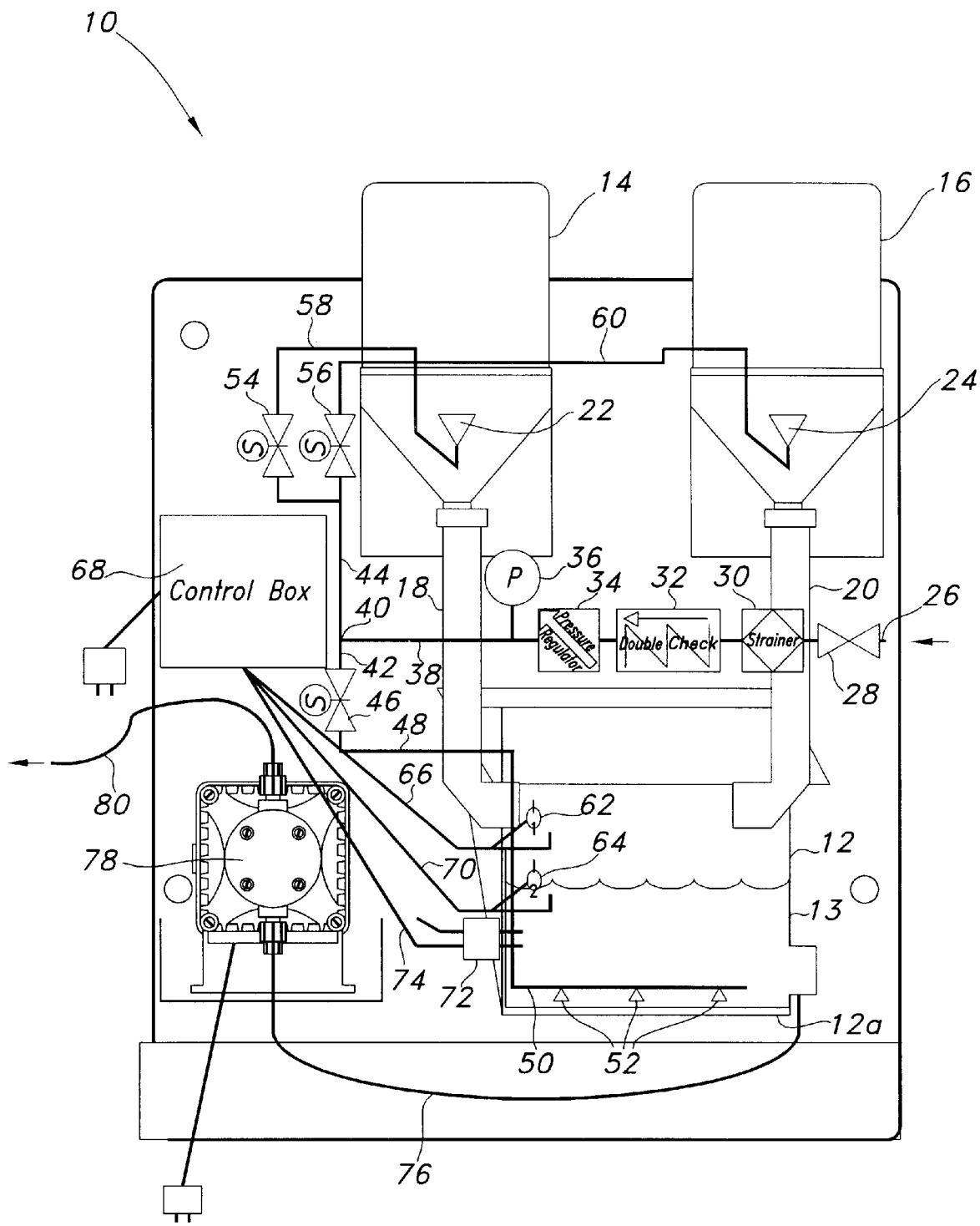

By reference now to the drawing, there is shown in the FIGURE a schematic representation of a dual solid chemical feed dispenser system 10 in accordance with a preferred arrangement thereof. Feed system 10 has particular application for applying chemical treatment to boilers and cooling towers in industrial processes, although the invention may be used to dispense desirable liquid solutions from the solid chemical feed dispensing system for other suitable applications. It should be further understood that the feed system 10 may be employed as a self-sustaining unit that may be used in industrial or other applications as a separable module that may be connected and disconnected to those systems requiring chemical treatment.

Feed system 10 comprises a sump 12 that receives and contains therewithin a quantity of liquid solution 13, containing a desired chemical mix for use in treating equipment in industrial processes or the like. Two dispenser feed bowls 14 and 16 are in liquid communication with sump 12 through drains 18 and 20. Feed bowls 14 and 16 are preferably of the type that are used for controlling the quantity of chemicals dispensed therein by measuring the conductivity of the chemical solution. Such feed bowls are more fully described in U.S. Pat. No. 4,858,449 issued to Lehn, and are incorporated herein by reference for all purposes.

Each feed bowl 14, 16 is provided to contain a quantity of solid chemicals chosen for a particular application. Such solid chemicals are typically in solid, powder or granular form, and are soluble in liquid such as water. Granulated sulfites may be used, for example, for treating boilers or cooling towers for the removal of oxygen to inhibit corrosion. Such solid chemicals are generally readily commercially available.

A spray nozzle 22 and 24 is disposed within each of the respective bowls 14 and 16 to direct a spray of water under pressure to the chemicals contained within bowls 14 and 16 to dissolve chemicals contained therewithin, as will be described. Upon supply of pressurized water to solid chemicals contained within feed bowls 14,16 through spray nozzles 22, 24, the solid chemicals are suitably dissolved to form a liquid solution and are fed either by gravity or suitable pressure through drains 18, 20 to fill the sump 12 with a suitable amount of liquid solution 13.

System 10 is suitably connected to an external water supply (not shown) to provide a water source 26 for the system 10. Water supplied through the water source 26 is piped through a gate valve 28, a strainer 30, a double check valve 32 and a pressure regulator 34. Gate valve 28 is used to isolate the system 10 from the main water supply and may be turned off to allow maintenance of the system. Strainer 30 is used to prevent particles such as salt crystals or rust from entering the system, and thereby prevents spray nozzles from getting undesirably plugged. Double check valve 32 is provided to prevent backflow of water. Pressure regulator 32 is used to adjust the pressure to a constant pressure, for example, 30 psig, to maintain constant water flow rate and spray patterns in the bottom of the sump, as will be described. A suitable pressure gauge 36 is provided to measure the water pressure in the system 10.

Pressurized water flow in the water source 26 is supplied through a pipe 38 to a t-fitting 40 which diverts the pressurized water flow into two directions, namely through pipes 42 and 44. Pressurized water supplied through pipe 42 is fed through a solenoid activated valve 46 which regulates the flow of water through pipe 48 into the sump 12. Disposed at the terminal end of pipe 48 within sump 12, and located adjacent the bottom floor 12a of sump 12, is a manifold 50 comprising a plurality of spray jets 52. While three spray jets 52 are shown, it should be appreciated that any number of jets may be employed. Water piped through pipe 48 and through manifold 50 is used to fill the sump 12 to a suitable level as will be described. Spray jets 52 are also provided so that the liquid solution contained within sump 12 may be agitated so that particles of solid chemicals that may be deposited on the bottom floor 12a of sump 12 may be periodically circulated in the liquid solution 13 for mixing purposes.

Pressurized water flowing through pipe 44 is supplied to feed bowls 14 and 16 through solenoid activated valves 54 and 56, respectively. Pressurized water is supplied through valve 54 to bowl 14 through pipe 58, spray nozzle 22 being disposed at the end of pipe 58. Pressurized water is supplied through valve 56 to feed bowl 16 through pipe 60, with spray nozzle 24 being disposed at the terminal end of pipe 60.

Supported by sump 12 is an upper level switch 62 and a lower level switch 64. Upper level switch 62 is provided to serve as an alarm or shutdown device. Should the liquid solution 13 contained within sump 12 rise to the level of upper switch 62, a signal is sent through circuit 66 to a control box 68 indicating that the sump 12 is full and valves 46, 54 and 56 are closed, thereby preventing any further supply of water to the sump 12 or bowls 14 and 16. Lower level switch 64 is disposed in the sump 12 in a manner to determine when the level of liquid solution 13 falls below a certain level. At such time when the liquid solution 13 falls below the predetermined level, a signal is sent through circuit 70 to the control box 68 to open valve 46 to thereby allow the flow of water through pipe 48 into the sump 12 through the jets 52 in manifold 50. The level of the liquid solution 13 may also be increased by opening valve 54 to allow water to flow through pipe 58 into the sump 12 through nozzle 22 in bowl 14 through drain 18 or by opening valve 56 to allow water to flow through pipe 60 into sump 12 through nozzle 24 in bowl 16 through drain 20.

Disposed in the sump for suitable communication with liquid solution 13, and below the level of the lower level switch 64, is a sensor 72. Sensor 72, in the preferred arrangement, is of the type used to measure the conductivity of the liquid solution 13. The sensor is set to have a selected set point that generates a signal indicative of the conductivity of the liquid solution 13. The set point is selected to be sufficiently greater than the conductivity of clean water supplied to sump 12 through line 48 and the conductivity of the solution being fed to sump 12 through drains 18 and 20 from the feed bowls 14 and 16. For example, if the conductivity readings obtained from the liquid solution being fed through drains 18 and 20 is on the order of 12,000 to 15,000 umhos, a set point reading of 10,000 umhos would be acceptable for that particular application. It should be appreciated that other set points may be selected, depending upon the chemicals involved and the treatment desired. A signal from the sensor 72 is passed through circuit 74 to the control box 68 for activating valves 46, 54 and 56 in a manner to control the conductivity of the liquid solution 13, as will be detailed hereinafter.

Liquid solution 13 is suitably pumped through a supply line 76 by an external pump 78 to a boiler, water tower, or other application through a supply line 80. Control box 68 contains suitable conventional electrical circuitry in connection with upper switch 62, lower switch 64, sensor 72 and solenoid activated valves 46, 54 and 56 to control the operation of the feed system 10. Control box 68 further includes suitable conventional timer circuits.

Having described the components and features of the feed system 10, the operation thereof is now described. Initially, the sump 12 is filled with fresh water received through the water source 26, with solenoid valve 54 in the open position and solenoid valves 46 and 56 in respective closed positions. Water is piped under suitable pressure, for example, 30 psig through supply pipe 58 and through the nozzle 22 into bowl 14 through drain 18 to fill sump 12. When the level of water in the sump 12 reaches the lower level switch 64, valve 54 is closed, thereby preventing any further flow of water to enter sump 12. When the upper level switch 62 is activated, indicating that the sump 12 is full, none of the valves 46, 54 or 56 can be opened, thereby protecting the system from any undesirable overflow of water.

When the water level falls below the level of lower level switch 64 for a minimum period of time, for example, five seconds, the control box 68 opens solenoid valve 46 for a brief period of time, for example, 0.5 seconds, to allow water to flow from the water source 26 through manifold spray jets 52 to agitate the solution in the sump 12. This is followed by a brief period, for example, five seconds, to allow for a representative conductivity reading by sensor 72. Based upon the conductivity of the liquid solution 13 in the sump 12, one of the appropriate valves 46, 54 or 56 is opened for a short period, for example, ten seconds, to refill the sump 12 to a level slightly above the lower level switch 64 activation range. If the conductivity of the liquid solution 13 is below the established conductivity set point, for example, 10,000 umhos, solenoid valve 54 will be opened while valves 46 and 56 are maintained closed. As such, water will be supplied from the water source 26 through spray nozzle 22 in feed bowl 14 to allow the introduction of dissolved chemicals through drain 18 into sump 12 so as to raise the conductivity of the liquid solution 13 in the sump 12. If, on the other hand, the conductivity of the liquid solution 13 is above the conductivity set point, solenoid valve 46 is opened and valves 54 and 56 are maintained closed. Fresh water is thus supplied through the water source 26 into the sump 12 through manifold jets 52 to thereby lower the conductivity of the liquid solution 13.

As indicated, feed bowl 14 is thus used as a primary source to raise the conductivity of the liquid solution 13 in sump 12. When the primary bowl 14 is depleted of its chemical supply after a certain amount of time has elapsed and the conductivity of the liquid solution 13 is not being raised, the system 10 automatically switches over the primary bowl 14 to serve as the back-up bowl and the initial back-up bowl 16 to serve as the primary bowl. For example, if the conductivity of liquid solution 13 is below the predetermined set point, solenoid valve 54 is opened while valves 46 and 56 are closed to allow fresh water to enter into feed bowl 14. Should the chemicals in bowl 14 be depleted while valve 54 is normally opened, only water rather than chemically treated solution, will fill sump 12 through drain 18. The system control box 68 includes a conventional timing circuit that will preferably allow for several sump fill cycles to occur before switching over to the back-up bowl 16, so as to prevent premature switchover. For example, the timing circuit in control box 68 may be set for a default time of four hours, or any other predetermined time period, before the back-up bowl 16 is activated to raise the conductivity of the liquid solution 13. Back-up bowl 16 is activated by closing normally opened valve 54 and opening normally closed valve 56, while keeping valve 46 closed. After the switchover occurs, the primary bowl 14 may be used to lower the conductivity of liquid solution 13 through valve 54, rather than through valve 46, since there are no more chemicals in the bowl 14. It should also be understood that in the alternative, the conductivity of the liquid solution 13 may be lowered by opening valve 46 and closing valves 54 and 56, thus allowing fresh water to be supplied to sump 12 until liquid solution conductivity is desirably lowered.

When the operation of system 10 is started with both feed bowls 14 and 16 full of desired solid chemicals, it does not matter which bowl 14 or 16 serves as the "primary" feed supply. Over a period of time, whichever bowl serves as the primary source will ultimately be depleted of chemicals and will reach the point where the conductivity of the liquid solution 13 in sump 12 cannot be raised above the conductivity set point by solution from that feed bowl. After a time delay such as four hours, as noted hereinabove, to allow for minor fluctuations so as to not cause premature switchover, the other bowl will be activated so that the conductivity of the liquid solution 13 can be raised. At the time the back-up bowl is switched over, an indication will be provided by the control box 68 to prompt the replacement of the primary, emptied bowl. Similarly, at the time the control box 68 is activated for empty bowl replacement, the control box 68 will initiate a short flush, for example, ten seconds of the initial primary bowl by opening either valve 54 or 56 so that any residual chemicals in the initial primary feed bowl may be removed upon switching over to the back-up bowl. Additionally, during operation of the system, the control box may be programmed in a known manner to simultaneously open all three solenoid valves 46, 54 and 56 for a brief period of time, for example, one second, to maintain the solid chemical feed moist and also to agitate the liquid solution 13 in the sump 12.

Having described the preferred embodiments of the invention herein, it should be appreciated that variations may be made thereto without departing from the contemplated scope thereof. For example, while a particularly preferred arrangement of the system comprises two feed bowls, it should be appreciated that the system of the present invention may use three or more such bowls, each one being automatically activated when the supply of feed in a bowl in prior use is exhausted. Also, while measurement of liquid solution conductivity is the preferred manner of controlling the feed supply, it should be understood that other solution properties, such as pH or oxidation reduction potential (ORP) may also be used. Further, while water is commonly used as a readily available source, other liquids may be used in conjunction with suitable solid chemicals to provide desirable liquid solutions for particular treatment purposes.

In addition, it should also be appreciated while the conductivity of the liquid solution is controlled as described herein in the context of a dual solid chemical feed system, the invention contemplates controlling liquid solution in other feed systems that may use one or more feed bowls. For instance, the system depicted in the FIGURE may be modified to have only one feed bowl, such as bowl 14. In this situation, when sensor 72 senses that the conductivity of the liquid solution 13 is below the predetermined conductivity set point, valve 46 will be closed and valve 54 will be opened, thereby allowing water to be supplied from the water source 26 through spray nozzle 22. This will cause the introduction of dissolved chemicals through drain 18 into sump 12 to raise the conductivity of the liquid solution 13. When the sensor 72 determines that the conductivity of the liquid solution 13 is higher than the predetermined conductivity set point, a signal is sent to close valve 54 and open valve 46, thereby allowing fresh water to enter sump 12 from the water source 26 to thereby lower the conductivity of the liquid solution 13. This process will continue until the chemicals in the feed bowl 14 are depleted and a new supply of chemicals is provided.

Accordingly, the preferred embodiments described herein are intended in an illustrative rather than limiting sense. The true scope of the invention is set forth in the claims appended hereto.

What is claimed is:

1. A solid chemical feed system, comprising:
   at least two feed bowls, each containing a quantity of solid chemicals that dissolve upon immersion in liquid to form a liquid solution;
   a valve system coupled to said feed bowls for separately controlling the introduction of liquid to the solid chemicals contained in each feed bowl;
   a sump for receiving liquid solution from each feed bowl, and for containing such liquid solution at a predetermined level;
   a sensor supported by said sump in communication with said contained liquid solution for sensing a given preselected property of said liquid solution and generating a signal in response to detection of such property; and
   a control unit responsive to said signal for controlling the valve system to alternatingly switch the introduction of liquid from one feed bowl to the other.

2. A solid chemical feed system according to claim 1, wherein said control unit comprises a time controller for delaying the activation of said valve system for a certain period of time after said sensor detects said preselected property.

3. A solid chemical feed system according to claim 1, comprising a first feed bowl and a second feed bowl, and wherein said valve system comprises a first valve coupled to said first feed bowl and a second valve coupled to said second feed bowl.

4. A solid chemical feed system according to claim 3, wherein said feed system comprises a source for supplying liquid under pressure to each of said bowls.

5. A solid chemical feed system according to claim 4, wherein said liquid source comprises a manifold disposed in said sump, said manifold comprising multiple spraying jets for introducing liquid into said sump.

6. A solid chemical feed system according to claim 5, further including a third valve, said third valve being coupled to said liquid source for controlling the introduction of liquid into said sump through said manifold.

7. A solid chemical feed system according to claim 6, wherein said first, second and third valves are responsive to a signal from said sensor for activating said valves to open or closed positions.

8. A solid chemical feed system according to claim 7, further comprising a lower level switch supported by said sump for communication with said liquid solution, said lower level switch providing a signal to said control unit when the level of said liquid solution falls below said predetermined level.

9. A solid chemical feed system according to claim 8, wherein said third valve is responsive to said signal from said lower level switch for opening said third valve to allow flow of liquid into said sump through said manifold.

10. A solid chemical feed system according to claim 9, further comprising an upper level switch supported by said sump for communicating with said liquid solution contained therein, said upper level switch providing a signal to said first, second and third valves to keep all such valves in a closed position to thereby prevent any flow of liquid to said bowls and said sump.

11. A dual solid chemical feed system, comprising:
    two feed bowls, each containing a quantity of solid chemicals that dissolve upon immersion in water to form a liquid solution;
    a source for supplying water to each bowl;
    a first valve coupled to said water source for controlling the supply of water to one of said bowls, said first valve being in a normally open position to allow flow of water to said one of said bowls;
    a second valve coupled to said water source for controlling the supply of water to the other of said bowls, said second valve being in a normally closed position to prevent flow of water to said other of said bowls;
    a sump for receiving liquid solution from each of said bowls and for containing liquid solution therein at a predetermined level;
    a sensor supported by said sump in communication with liquid solution for sensing the conductivity of said liquid solution and for generating a signal at a predetermined conductivity of said liquid solution; and
    a control unit responsive to said signal for closing said first valve, thereby preventing flow of water to said one of said bowls and opening said second valve, thereby allowing flow of water to said other of said bowls.

12. A dual chemical feed system according to claim 11, wherein said control unit comprises a time controller for delaying the activation of said first valve and said second valve for a certain period of time after said sensor senses said predetermined conductivity of said liquid solution.

13. A dual solid chemical feed system according to claim 12, further including a third valve coupled to said water source for controlling the introduction of water into said sump.

14. A dual chemical feed system according to claim 13, wherein said water source comprises a manifold disposed in said sump, said manifold including multiple spraying jets.

15. A dual chemical feed system according to claim 14, further comprising an upper level switch supported by said sump for communicating with said liquid solution contained therein, said upper level switch providing a signal to said first, second and third valves to keep all such valves in a closed position to thereby prevent any flow of water to said bowls and said sump.

16. A dual chemical feed system according to claim 15, further comprising a lower level switch supported by said sump for communicating with said liquid solution, said lower level switch providing a signal to said third valve to open said valve to allow flow of water into said sump when the level of said liquid solution falls below a predetermined level.

17. A dual chemical feed system according to claim 16, wherein said control unit comprises a time controller for closing said third valve after being opened a predetermined amount of time.

18. A dual chemical feed system according to claim 17, wherein said third valve is responsive to a signal from said sensor for activating said third valve to open or closed positioned.

19. A dual chemical feed system according to claim 18, wherein said control unit comprises a time controller for opening said first, second and third valves simultaneously for a predetermined period of time.

20. A dual chemical feed system according to claim 18, further comprising a pressure regulator coupled to said water source to supply water to said manifold under pressure.

21. In a solid chemical feed system for supplying liquid solution containing dissolved chemicals, an apparatus for controlling the conductivity of the liquid solution, comprising:

at least one feed bowl containing a quantity of solid chemicals that dissolve upon immersion in water to form a liquid solution;

a sump for receiving said liquid solution from said at least one bowl and for containing such liquid solution therein at a predetermined level;

a water source;

a first valve coupled to said water source for controlling the supply of water to said at least one bowl;

a second valve coupled to said water source for controlling the supply of water to said sump;

a sensor in said sump in communication with said liquid solution for sensing the conductivity of said liquid solution and for generating a signal at a predetermined conductivity of said liquid solution; and a control unit responsive to said signal for opening said first valve and closing said second valve to thereby supply water to said feed bowl when said conductivity is below the predetermined conductivity and for closing said first valve and opening said second valve to thereby supply water to said sump when said conductivity is above the predetermined conductivity.

22. The apparatus according to claim 21, further comprising:

a second feed bowl containing a quantity of solid chemicals that dissolve upon immersion in water to form a liquid solution for introduction into said sump;

a third valve coupled to said water source for controlling the supply of water to said second feed bowl, said third valve being normally closed by said control unit while the conductivity of said liquid solution in said sump is raised by the supply of liquid solution from said one feed bowl through the controlled opening of said first valve.

23. The apparatus according to claim 22, further comprising a time controller for closing said first valve and opening said third valve when the sensor fails to detect the conductivity of said liquid solution above the predetermined conductivity for a preselected period of time, thereby indicating that the chemicals in said one bowl are substantially depleted.

24. The apparatus according to claim 23, wherein said control unit is responsive to a signal from said sensor that said conductivity of said liquid solution in said sump is above the predetermined conductivity to close said third valve and alternatively open said first valve to supply water to said one bowl, wherein said chemicals are depleted, or open said second valve to said supply water from said water source, until said predetermined conductivity is reached.

* * * * *